US005491611A

United States Patent [19]
Stewart et al.

[11] Patent Number: 5,491,611
[45] Date of Patent: Feb. 13, 1996

[54] ALIGNED QUICK CONNECT COVER FOR A COMPUTER SYSTEM

[75] Inventors: Thomas K. Stewart, Spring; Thomas T. Hardt, Missouri City, both of Tex.

[73] Assignee: Compaq Computer Corporation, Houston, Tex.

[21] Appl. No.: 119,993

[22] Filed: Sep. 10, 1993

[51] Int. Cl.$^6$ .................................................. H05K 1/14
[52] U.S. Cl. ...................... 361/736; 312/223.2; 312/263
[58] Field of Search .................... 174/35 R; 248/147, 248/676, 198; 312/223.2, 257.1, 263, 265.2, 265.3, 265.5, 265.6; 361/679–688, 724, 732, 740, 759, 797, 802, 816, 818, 829

[56] References Cited

U.S. PATENT DOCUMENTS

| | | | |
|---|---|---|---|
| D. 313,015 | 12/1990 | Ryan et al. | D14/100 |
| 2,658,101 | 11/1953 | Coxe, Jr. | 174/51 |
| 3,187,281 | 6/1965 | Weiner et al. | 361/818 |
| 3,779,623 | 12/1973 | Motohashi | 312/257.1 |
| 3,899,721 | 8/1975 | Borchard et al. | 317/101 |
| 4,065,200 | 12/1977 | D'Angelo | 339/65 |

(List continued on next page.)

FOREIGN PATENT DOCUMENTS

| | | | |
|---|---|---|---|
| 0176907A | 4/1986 | European Pat. Off. | 361/394 |
| 1366567 | 6/1964 | France | 361/415 |
| 1-194397(A) | 8/1989 | Japan | 361/415 |
| 1270399 | 10/1989 | Japan | 361/388 |
| 659165A | 12/1986 | Switzerland | 361/415 |
| 1140276A | 2/1985 | U.S.S.R. | 361/415 |
| 87/05776 | 9/1987 | WIPO | 361/415 |

OTHER PUBLICATIONS

One (1) sheet of drawings by Tom Hardt dated Aug. 16, 1994 disclosing a prior art "Pro Signia" computer fastening means manufactured by Compaq Computer Corporation in 1991.
Three (3) original 8"×10" photographs disclosing a prior art "Pro Signia" computer fastening means manufactured by Compaq Computer Corporation in 1991.
Ser. No. 08/106,051, Madsen et al "Card Extender Unit for Computer" filing date Aug. 12, 1993.
Ser. No. 07/955,651, Allen et al "Lockable Computer Tower Unit Housing", filing date Oct. 2, 1992.
3 photographs of bottom of IBM PS/2 Model 80 unit (cited in U.S. Pat. No. 5,020,768 listed above) (2 pgs. total).
AST Computers Advertisement in PC Week, Feb. 19, 1990, pp. 67–70 (cited in U.S. Pat. No. 5,020,768 listed above).
ALTEC Technology Corp. Advertisement in INFOWORLD, Feb. 5, 1990, pp. 87–88 (cited in U.S. Pat. No. 5,020,768 listed above).
Sys Technology, Inc. Advertisement in PC Week, Feb. 12, 1990, pp. 99–100 (cited in U.S. Pat. No. 5,020,768 listed above).
IBM Tech. Discl. Bulletin, vol. 29, No. 9, Feb. 1987, pp. 4117–4118, "Bridge Assembly for Mounting Electromagnetic Devices" (no author).
IBM Tech. Discl. Bulletin, vol. 28, No. 12, May 1986, pp. 5519–5521, "Spring–Loaded File Rails" (no author).
IBM Tech. Discl. Bulletin, vol. 30, No. 1, Jun. 1987, pp. 392–393, "Direct–Access Storage Device Commodity–Stacking Plates" (no author).
IBM Tech. Discl. Bulletin, vol. 28, No. 6, Nov. 1985, pp. 2514–2515 "Universal, Low–Cost Hard–File Mounting Assembly" (no author).
Advertisements in PC Week, Feb. 19, 1990 (2 pages).
One piece U–shaped cover of a main system unit having hooks on each of its ends that are received in slots in the bottom sides of a frame or chassis of the main system unit as disclosed on p. 1 of the application. No date.

*Primary Examiner*—Gregory D. Thompson
*Attorney, Agent, or Firm*—Pravel, Hewitt, Kimball & Krieger

[57] ABSTRACT

A computer system having a cover for a frame is disclosed. The cover has a user panel and a service panel each including a plurality of inwardly extending and angled slots to be aligned with rearwardly facing tabs on the frame to facilitate a quick sliding connection of the cover to the frame.

28 Claims, 2 Drawing Sheets

U.S. PATENT DOCUMENTS

| | | | |
|---|---|---|---|
| 4,232,356 | 11/1980 | Saunders et al. | 361/415 |
| 4,304,966 | 12/1981 | Beirn et al. | 179/1 MN |
| 4,349,237 | 9/1982 | Cobaugh et al. | 339/65 |
| 4,356,531 | 10/1982 | Marino et al. | 361/384 |
| 4,479,263 | 10/1984 | Rosenfeldt et al. | 455/602 |
| 4,517,512 | 5/1985 | Petrich et al. | 324/73 R |
| 4,532,576 | 7/1985 | Reimer | 361/415 |
| 4,713,633 | 12/1987 | Saito et al. | 361/816 |
| 4,742,478 | 5/1988 | Nigro, Jr. et al. | 364/708 |
| 4,748,540 | 5/1988 | Henneberg et al. | 361/424 |
| 4,761,975 | 8/1988 | Kachnowski et al. | 70/232 |
| 4,772,079 | 9/1988 | Douglas et al. | 312/257 R |
| 4,920,453 | 4/1990 | Onose et al. | 361/392 |
| 5,020,768 | 6/1991 | Hardt et al. | 248/678 |
| 5,021,616 | 6/1991 | Hardt | 200/43.16 |
| 5,162,976 | 11/1992 | Moore et al. | 361/393 |
| 5,164,886 | 11/1992 | Chang | 361/390 |
| 5,197,789 | 3/1993 | Lin | 312/223.2 |
| 5,208,722 | 5/1993 | Ryan et al. | 360/99.01 |
| 5,216,907 | 6/1993 | Ullmann | 70/159 |
| 5,236,259 | 8/1993 | Ryan et al. | 312/244 |

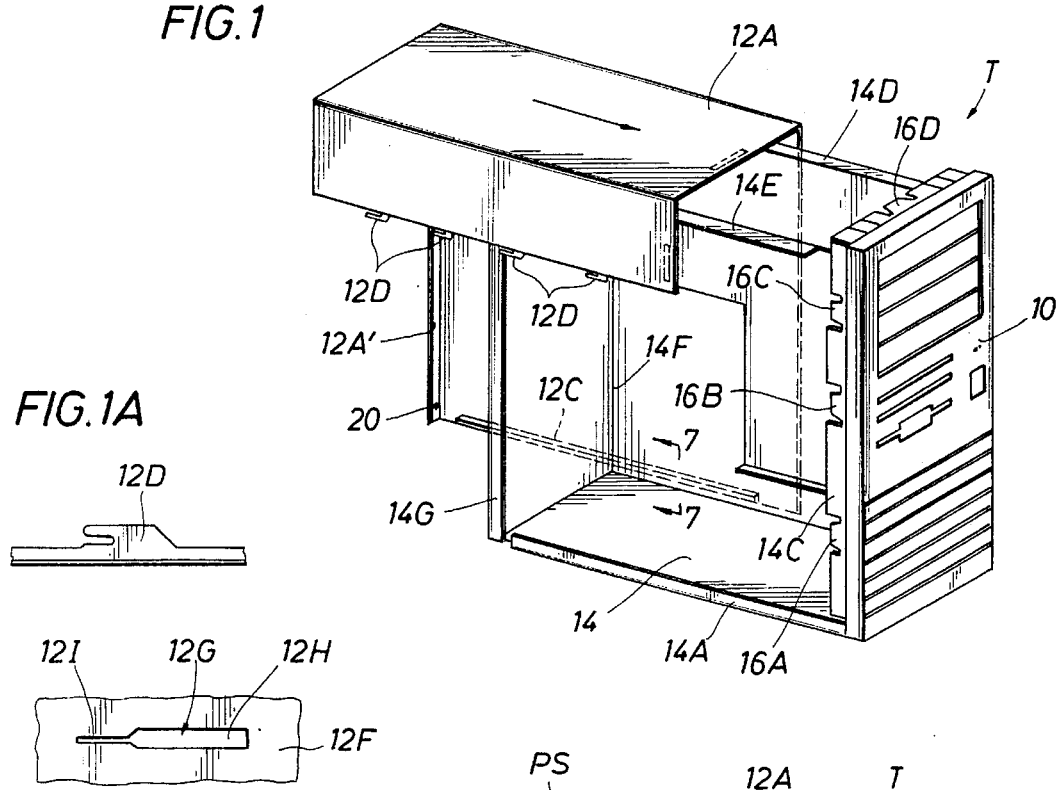
FIG.1
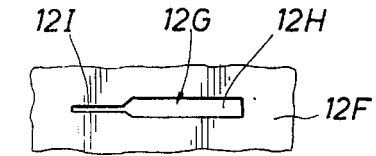
FIG.1A
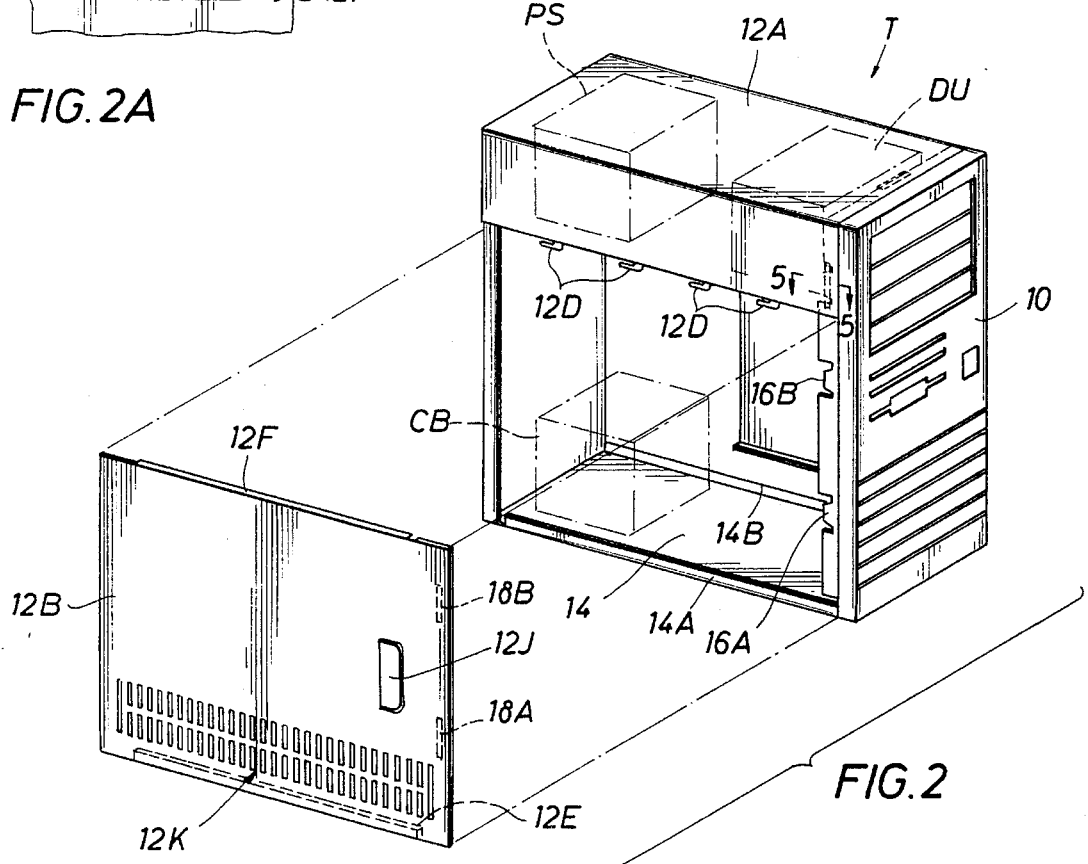
FIG.2A
FIG.2

ALIGNED QUICK CONNECT COVER FOR A COMPUTER SYSTEM

SPECIFICATION

1. Field of the Invention

The present invention relates to a computer system and particularly a cover for a computer system frame.

2. Background of the Invention

Personal computers are generally comprised of three physical components. First, there is the main system unit which holds most of the computer operation internals, such as power supply, circuit boards and drive units. A keyboard is used for data entry and a display screen or monitor is provided for the display of data. Typically, all three of these components are arranged on a desk top with the keyboard placed in front of the system unit and the display screen or monitor placed on top of the system unit. This arrangement is, of course, well known. In this typical arrangement a one piece U-shaped cover of the main system unit has hooks on each of its ends that are received in slots in the bottom sides of a frame or chassis of the main system unit. Once the hooks are received in the slots, the cover is slid forward until the rear of the cover engages the frame. Fasteners, such as screws, are then used to fasten the rear of the cover to the frame.

In an effort to minimize the desk surface area required for a personal computer, system units have been placed on the floor next to desks or tables. In that configuration, the system units are generally rectangular boxes and are designed to stand with the longest axis in the vertical direction on the floor. These systems are called "tower units". In this arrangement, a one piece U-shaped cover has been attached to both the front and rear of the chassis or frame using fasteners such as screws.

In both of these arrangements, the attachment of the cover to the frame has been difficult, particularly because of alignment problems, and time consuming. It would be desirable to provide a cover that quickly and inexpensively connects to the frame. Since the circuit boards are generally located in the lower portion of the frame, it would also be desirable to have a cover for these computers that includes a user panel that provides access to the circuit boards while a cover service panel remains on the frame. The service panel would only be removed to provide access to the power supply and drive units, such as floppy drives, hard drives and tape drives.

SUMMARY OF THE INVENTION

A computer system including a frame for mounting a plurality of circuit boards is disclosed. A plurality of rearwardly facing tapered tabs are stamped into the front of the frame. The cover slides along upright members on the frame to align a plurality of inwardly facing slots with the tabs to attach the cover to the frame. The slots are angled inwardly to facilitate alignment and attachment of the plurality of slots to the corresponding tabs.

The cover includes a user panel and a service panel. The user panel can be removed to allow access to the circuit boards while the service panel remains attached to the frame. Slidable connectors are provided between the user panel and service panel to facilitate quick connection of the user panel to the frame.

These features of the invention are not necessarily the only features that will be disclosed in the specification. Additionally, the features of the invention have been described herein in a summary fashion. It is not the intent to disclose all of the features nor the true scope of the invention within this Summary of the Invention. The specification will describe the details of this invention for the understanding of those skilled in the art and the claims will describe the actual scope of the invention.

BRIEF DESCRIPTION OF THE DRAWINGS

The objects, advantages and features of the invention will become more apparent by reference to the drawings which are appended hereto wherein like numerals indicate like parts and wherein an illustrated embodiment of the invention is shown, of which:

FIG. 1 is a perspective view of the main system unit of the present invention illustrating the rearwardly facing tabs on the frame and the J-shaped service panel of the present invention;

FIG. 1A is an enlarged view of the hooks on the service panel of the present invention;

FIG. 2 is a perspective view similar to FIG. 1 showing the positioning of the user panel of the present invention;

FIG. 2A is a detailed view of a typical slot located on the user panel to receive the hooks shown in FIG. 1A.

DETAILED DESCRIPTION OF PREFERRED EMBODIMENT

Figure 3:
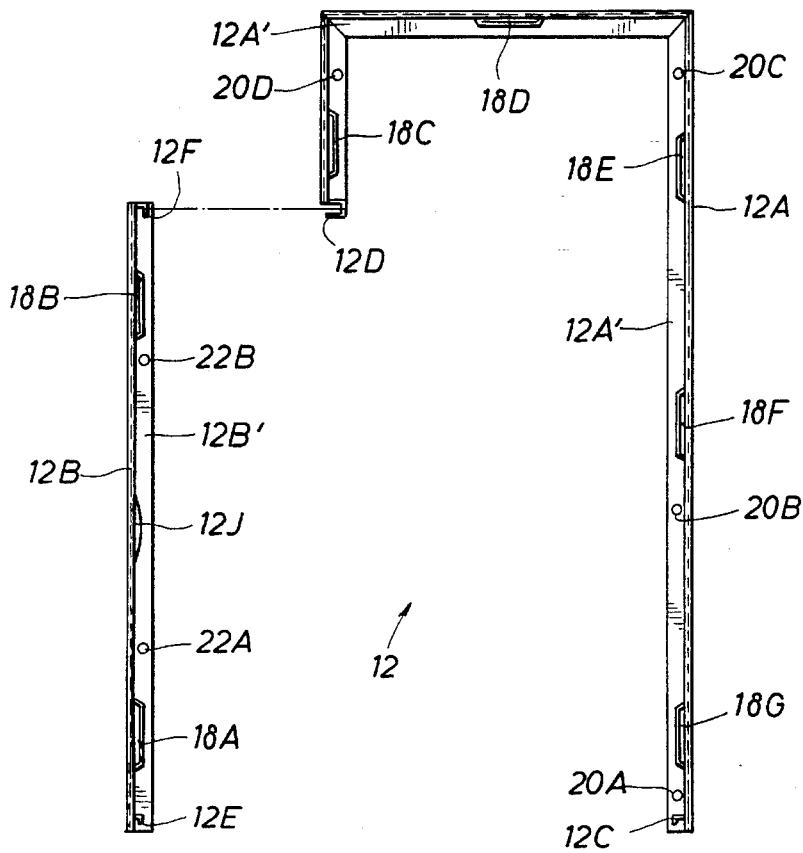
FIG. 3 is a front elevational view of the cover of the present invention.

Referring to the drawings, the "T" generally designates the tower unit of the present invention. Though the tower unit is disclosed, it is to be understood that the present invention could be used with the typical desk top main system unit discussed in the Background of the Invention. The tower unit T is generally rectangular in configuration with its longest axis in the vertical direction. As illustrated in FIG. 1, the tower unit T includes a front bezel 10, a rear bezel (not shown) and a U-shaped cover 12 having a J-shaped service panel 12A and a user panel 12B. The front bezel 10 attaches directly to the frame 14, as best seen in FIG. 1.

Though not shown, the front bezel 10 may include an upwardly angled disk drive bay that cooperates with the tower unit chassis or frame to mount one or more disk drives at an upwardly facing angle so the user may have a better view and better access to the disk drive units for the insertion or removal of floppy disks. An angled disk drive bay is described in detail in U.S. Pat. No. 5,208,722 which is incorporated herein by reference for all purposes and is assigned to the assignee of the present invention. The upwardly angled bay could further include a switch cover assembly which will not be described herein but is the subject of U.S. Pat. No. 5,021,616, which is incorporated herein by reference for all purposes and is also assigned to the assignee of the present invention.

The tower unit T could further include a stabilizing apparatus with extensible legs that may be attached to the bottom of the tower unit to provide stability and extensible support to the unit. This stabilizing apparatus is described in detail in U.S. Pat. No. 5,020,768 which is incorporated herein by reference for all purposes and is also assigned to the assignee of the present invention. One design for the tower unit could be as disclosed herein or as disclosed in U.S. Design Pat. No. 313,015 which is also incorporated herein by reference for all purpose and assigned to the assignee of the present invention.

Figure 4:
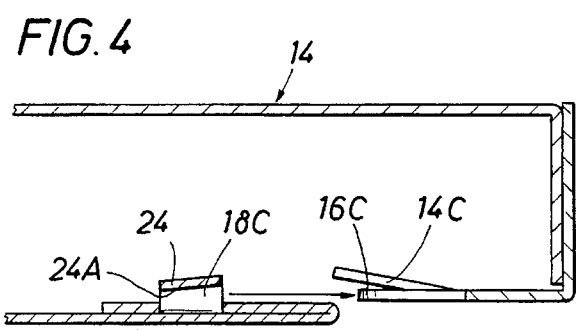
FIG. 4 is an enlarged section view of a tab prior to connection of the service panel to the frame.
Figure 5:
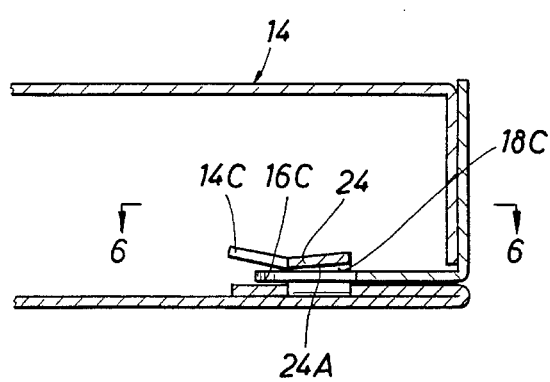
FIG. 5 is an enlarged section view taken along line 5—5 of FIG. 2 upon connection of the service panel to the frame.
Figure 6:
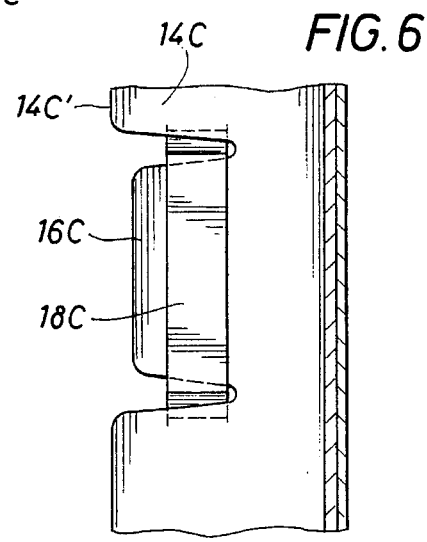
FIG. 6 is a section view taken along line 6—6 of FIG. 5.
Figure 7:
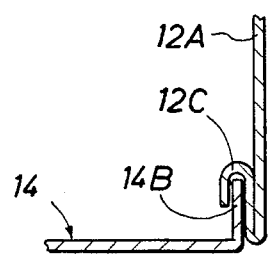
FIG. 7 is an enlarged detail elevational view taken along line 7—7 of FIG. 1.

Generally, as shown in FIG. 2, a power supply PS is located in the upper rear portion of the frame 14 with the user drive units DU, such as floppy disk drives, hard drives and tape drives, being located in the upper front portion of the frame 14. In the lower portion of the frame circuit boards CB are removably mounted so they can be removed and inserted by the user. Generally, repair and maintenance to the drive units and power supply are considered service repair beyond the general desire or capabilities of user. The frame 14 includes an upright member 14A on the user panel side and an upright member 14B on the service panel side, as best shown in FIGS. 2 and 7. The front of the frame further includes a marginal portion or member 14C including a plurality of tabs 16A, 16B, 16C and 16D and three similar tabs on the service panel side to correspond to the slots in the service panel 12A, as will be discussed below. A typical tab, such as tab 16C, as shown in FIG. 2, is shown enlarged and in section in FIG. 5. As best seen in FIG. 6, a typical tab does not extend beyond the edge 14C' of the frame marginal portion 14C. As best shown in FIGS. 4 and 5, the marginal portion 14C is angled inwardly to assist in alignment of the cover 12 with the tabs. Also, as best shown in FIG. 6, the tabs are tapered as they extend rearwardly to further assist in the connection of the tabs to the cover.

The service panel 12A of the cover 12 includes a U-shaped connector 12C, as best shown and enlarged in FIG. 7, to be received on top of the frame upright member 14B. The J-shaped service panel 12A is positioned both on this upright 14B and the top frame members 14E and 14D to align the plurality of inwardly extending slots 18C, 18D, 18E, 18F and 18G with corresponding frame tabs to provide a sliding connection of the service panel 12A to the frame 14. The service panel 12A is properly attached with the frame 14 when all the tabs are fully received within their respective slots, such as shown in FIGS. 5 and 6. Additionally, the rear bracket 12A' of the service panel 12A can be attached to the frame by use of TORX® security pins to discourage access by the user. These security pins can be received through holes 20A, 20B, 20C and 20D in the bracket 12A' into the frame members 14F and 14G, as best shown in FIGS. 1 and 3. At the other end of the service panel 12A from the U-shaped connection 12C are a plurality of rearwardly facing hooks 12D. An enlarged view of a typical hook 12D is shown in FIG. 1A.

Turning now to FIGS. 2 and 3, the user panel 12B includes a U-shaped connector 12E, a mirror image of the U-shaped connector 12C, shown in detail in FIG. 7. At the other end of the user panel, a metal plate 12F, as best shown in FIGS. 2 and 3, includes four slits that are spaced so as to receive the rearwardly facing hooks 12D. As best shown in FIG. 2A, these slits 12G include an enlarged portion 12H to receive the hooks 12D and a narrow portion 12I. Once the hooks 12D are received into the slits 12G of the user panel 12B, the user panel 12B is moved upwardly so that the U-shaped connector 12E is positioned on the upright 14A of the frame 14. In this position the cover slots 18A, 18B of the user panel 12B are properly aligned with their respective frame tabs 16A, 16B. This alignment is further enhanced by the inwardly angled slot and tapered tab to facilitate an aligned quick connection of the user panel to the frame. A gripping handle 12J assists the user in moving the user panel.

Additionally, though not required, the user panel could include a conventional Knurl-type fastener to connect the user panel 12B to the frame member 14G. These easily releasable Knurled connectors could be received through the holes 22A, 22B in the rear bracket 12B', as best shown in FIG. 3, and into frame member 14G.

As is now obvious from the above disclosure, the user panel could be removed to allow access to the circuit boards CB located in the lower portion of the frame 14 while the service panel remains attached to the frame. To remove the user panel 12B, the user would grip the handle 12J to move the user panel rearwardly approximately ¾ inch so as to clear the slots 18A and 18B from their respective tabs 16A and 16B. This movement would also position the hooks 12D in the enlarged portion 12H of the slits 12G in the user panel member 12F. The user panel 12B is then lifted upwardly to clear the U-shaped connector 12E from the frame upright member 14A and the bottom portion of the user panel is swung outwardly and removed.

Fasteners such as the TORX® security pins and the Knurl fasteners could be used, for example, to provide a conductive seal to inhibit electro motive interference (EMI) leakage to meet Underwriter Laboratory (UL) regulations.

The tabs can be stamped from the marginal portion 14C of the frame 14 with minimal manufacturing cost and the slots can be formed by stamping out a band 24 from the cover so that when the marginal portion of the cover is folded back on itself, the band 24 angles inwardly to the tower unit, as best shown in FIGS. 4 and 5. As best shown in FIG. 5, the trailing edge 24A of band 24 provides an interference fit with the tab to hold the cover to the frame. Additionally, this contact of the band trailing edge 24A to the frame tab electrically grounds the cover to the frame to reduce concerns of EMI leakage.

Additionally, the user panel 12B is shown with a plurality of openings, generally indicated at 12K, for venting the tower unit T. The front and rear bezels could also include an opening for venting and are preferably made from a suitable polycarbonate plastic which may be injection molded or otherwise manufactured. The preferred frame uses 18 gauge steel that has been electro-galvanized with zinc and sealed with a clear chromate. The cover 12 is preferably made from a 20 gauge sheetmetal having an electro-galvanized bright zinc sealed with a clear chromate.

The foregoing disclosure and description of the invention are illustrative and explanatory thereof, and various changes in the size, shape and materials, as well as the details of the illustrative construction may be made without departing from the spirit of the invention.

What is claimed is:

1. Apparatus adapted for use with a computer system comprising a frame having a front end and a rear end;

a plurality of tabs being located adjacent said frame front end and extending rearwardly, a cover having a front end, and a plurality of slots formed by stamping said cover front end outwardly and folding back said cover front end so that said slots extend inwardly in said cover and are aligned to receive said plurality of tabs to attach said cover to said frame.

2. Apparatus of claim 1 further comprising circuit boards being removably supported in a lower portion of said frame.

3. Apparatus of claim 1 wherein said tabs taper rearwardly.

4. Apparatus of claim 1 further comprising an edge of said cover wherein said cover edge is U-shaped.

5. Apparatus adapted for use with a computer system comprising a frame having an edge, a front end and a rear end;

a plurality of tabs being located adjacent said frame front end and extending rearwardly, said plurality of tabs do not extend beyond said edge of said frame, a cover having a front end, and a plurality of slots disposed on said cover front end and aligned to receive said plurality of tabs to attach said cover to said frame.

6. Apparatus adapted for use with a computer system comprising a frame having a front end and a rear end;

a plurality of tabs being located adjacent said frame front end and extending rearwardly, a cover having a front end, said cover comprises two panels, one of said panels being J-shaped, and a plurality of slots disposed on said cover front end and aligned to receive said plurality of tabs to attach said cover to said frame.

7. Apparatus for use with a computer system comprising a frame having a front end and a rear end;

a plurality of tabs being located adjacent said frame front end and extending rearwardly, a cover having a front end, and a plurality of slots formed from said cover front end and angled inwardly as each slot extends towards said cover front end, said slots aligned to receive said plurality of tabs to attach said cover to said frame.

8. Apparatus for a computer system which includes a frame for mounting a plurality of circuit boards, the frame having a front end, a top and a bottom, comprising, a plurality of rearwardly facing tabs disposed on and adjacent the front of said frame, an upright member on the bottom of said frame, a cover having a user panel and a service panel, said cover having a plurality of inwardly facing slots corresponding to said tabs, said user panel having a top and a bottom, said service panel having a first end and a second end, and said user panel top being slidably interengaged with said second end of said service panel and said user panel bottom being slidably interengaged with said frame upright member so said cover slots of said user panel are aligned with said frame tabs to slidably attach said user panel to said frame.

9. Apparatus of claim 8 further comprising a second upright member on the bottom of said frame, wherein said service panel being J-shaped and sliding on the top of said frame and said first end of said service panel sliding on said second upright member so said cover slots of said service panel are aligned with said frame tabs to slidably attach said service panel to said frame.

10. Apparatus of claim 8 wherein said cover slots being angled inwardly to guide said frame tabs.

11. Apparatus of claim 8 wherein said user panel having a gripping handle to facilitate attaching said user panel to said frame.

12. Apparatus of claim 8 wherein said service panel second end having a plurality of hooks and said user panel having a plurality of slots to slidably interengage said panels.

13. Apparatus of claim 8 wherein said user panel bottom having a U-shaped connector to slidably interengage said frame upright member.

14. Apparatus of claim 8 wherein said user panel can be removed for access to the circuit boards while the service panel remains attached to said frame.

15. Apparatus of claim 8 further comprising a power supply and a drive unit disposed in the upper portion of said frame wherein said service panel can be removed for access to said power supply and said drive unit.

16. Apparatus for a computer system which includes a frame for mounting a plurality of circuit boards, said frame having two sides, a front, a top and a bottom, comprising, a plurality of rearwardly facing tabs adjacent the front of said frame, a slidable connection member on each side of the bottom of said frame, and a cover having a plurality of inwardly facing slots corresponding to said frame tabs and being slidably interengaged with said frame tabs so that said slots are aligned with said tabs to slidably attach said cover to said frame.

17. Apparatus of claim 16 wherein said cover having a user panel and a service panel, said user panel having a top and a bottom, said service panel having a first end and a second end.

18. Apparatus of claim 17 wherein said slidable connection members are first and second upright members and wherein said user panel top being slidably interengaged with said second end of said service panel and said user panel bottom being slidably interengaged with said first frame upright member so said slots of said user panel are aligned with said frame tabs to slidably attach said user panel to said frame.

19. Apparatus of claim 18 wherein said service panel being J-shaped and sliding on the top of said frame and said first end of said service panel sliding on said second upright member so said slots of said service panel are aligned with said tabs to slidably attach said service panel to said frame.

20. Apparatus of claim 17 wherein said second end of said service panel having a plurality of hooks and said user panel having a plurality of slots to slidably interengage said panels.

21. Apparatus of claim 17 wherein said user panel can be removed for access to the circuit boards while said service panel remains attached to said frame.

22. Apparatus of claim 17 further comprising a power supply and a drive unit disposed in the upper portion of said frame wherein said service panel can be removed for access to said power supply and said drive unit.

23. Apparatus adapted for use with a computer system comprising a frame having a first end and a second end;

a plurality of tabs being located adjacent said frame first end and extending towards said second end, a cover having a first end, and a plurality of slots formed by stamping said cover first end outwardly and folding back said cover first end so that said slots are positioned inwardly in said cover and are aligned to receive said plurality of tabs to attach said cover to said frame.

24. Apparatus adapted for use with a computer system comprising a frame for supporting a plurality of circuit boards and having a first end and a second end;

a plurality of tabs having an attached end and an opposed end opposite said attached end, said tabs disposed between said frame first end and said frame second end and said tabs attached end attached adjacent said frame first end and said tabs opposed end extending towards said frame second end, and a cover having a first end having an inwardly facing surface and an outwardly facing surface, said cover first end inwardly facing surface having a plurality of inwardly extending slots aligned to receive said plurality of tabs and said cover first end outwardly facing surface extends over said plurality of slots.

25. Apparatus of claim 24 further comprising an edge of said frame, said plurality of tabs do not extend beyond said edge of said frame.

26. Apparatus of claim 24 wherein said cover comprises two panels.

27. Apparatus of claim 24 wherein said plurality of slots are angled inwardly as each slot extends towards said cover first end.

28. Apparatus of claim 24 wherein said plurality of slots are stamped outwardly from said cover first end and folded back on said cover so that said slots extend inwardly in said cover.

* * * * *